United States Patent [19]
May

[11] Patent Number: 5,521,831
[45] Date of Patent: May 28, 1996

[54] METHOD AND SYSTEM FOR THE DETECTION OF COUNTERFEIT CREDIT OR DEBIT CARDS AND OTHER COUNTERFEIT OBJECTS

[75] Inventor: George A. May, Sooke, Canada

[73] Assignee: Doyle Argosy Innovators Ltd., Victoria, Canada

[21] Appl. No.: 225,714

[22] Filed: Apr. 11, 1994

[51] Int. Cl.⁶ .......................... G07D 7/00; G01R 19/25; G06K 19/067
[52] U.S. Cl. .................. 364/483; 340/825.34; 340/691; 235/488; 235/380
[58] Field of Search ..................... 235/379, 380, 235/381, 487–495; 364/464.02, 464.03, 483, 481, 551.01; 380/23, 25; 377/8; 902/27, 28; 340/825.31–825.35, 146.2, 573, 691

[56] References Cited

U.S. PATENT DOCUMENTS

| | | | |
|---|---|---|---|
| 3,636,318 | 1/1972 | Lindstrom et al. | 235/61.12 M |
| 4,218,674 | 8/1980 | Brosow et al. | 340/149 |
| 4,527,051 | 7/1985 | Stenzel | 235/380 |
| 4,532,419 | 7/1985 | Takeda | 235/492 |
| 4,650,978 | 3/1987 | Hudson et al. | 235/379 X |
| 4,686,357 | 8/1987 | Douno et al. | 235/379 X |
| 4,889,980 | 12/1989 | Hara et al. | 235/488 |
| 4,900,904 | 2/1990 | Wright et al. | 235/381 |
| 4,918,631 | 4/1990 | Hara et al. | 364/708 |

FOREIGN PATENT DOCUMENTS 3236374  4/1984  Germany.

*Primary Examiner*—Emanuel T. Voeltz
*Assistant Examiner*—Kamini S. Shah
*Attorney, Agent, or Firm*—Seed and Berry

[57] ABSTRACT

The present invention provides a method of authenticating objects, comprising embedding a unique plurality of randomly-located, irregularly shaped, non-interconnected, electrically conductive regions within the surface of said object to thereby provide a unique electrically readable signature correlated to the genuine document; providing a unique identifier on the object; providing means for electrically reading said unique signature and digitally storing the signature in connection with the unique identifier for that object, and when an object is to be authenticated, obtaining a digitized record of the signature and comparing it to the stored signature.

17 Claims, 5 Drawing Sheets

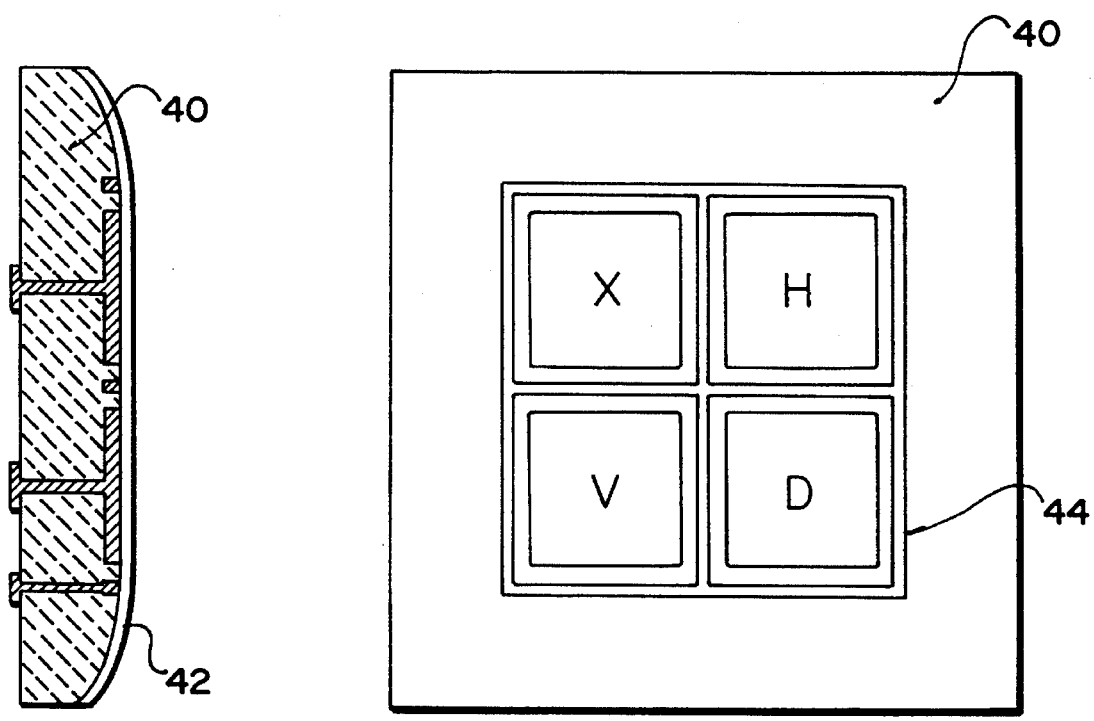
FIG. 6
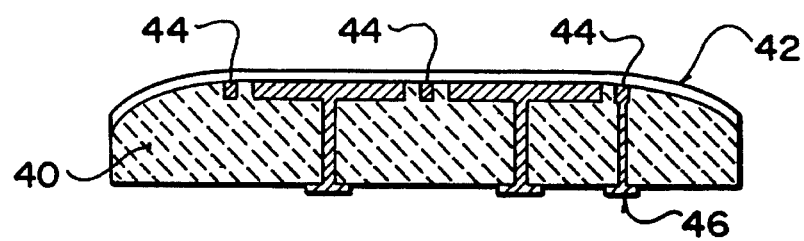
FIG. 7B
FIG. 7A
FIG. 7C

METHOD AND SYSTEM FOR THE DETECTION OF COUNTERFEIT CREDIT OR DEBIT CARDS AND OTHER COUNTERFEIT OBJECTS

TECHNICAL FIELD

The invention relates to the field of security sensitive documents and cards such as identity cards, credit cards and debit cards. More particularly the invention relates to a method of, and system for, authenticating such cards and detecting counterfeit cards or other documents.

BACKGROUND ART

Huge financial losses occur regularly as a result of the counterfeiting of security sensitive documents. For example, credit card fraud resulting from the production of counterfeit credit cards and the fraudulent use of such cards to acquire goods is a huge cost to credit card companies. Such companies have taken steps such as the incorporation of holograms into credit cards to make the manufacture of counterfeits more difficult, but sophisticated criminals are able to duplicate such holograms, sometimes by infiltrating the card manufacturing facility. There remains therefore a need for reliable methods for authenticating security sensitive objects or documents such as credit cards.

DISCLOSURE OF INVENTION

The present invention provides a method of authenticating objects, comprising embedding a randomly-located plurality of irregularly shaped, non-interconnected, electrically conductive regions within the surface of the object to thereby provide a unique electrically readable signature correlated to the genuine document; providing a unique identifier on the object; and providing means for electrically reading the unique signature and digitally storing the signature in connection with the unique identifier for that object, whereby when an object is to be authenticated, the signature of the object can be read and compared to the stored signature correlating to the identifier on the object.

According to one aspect of the invention the means for reading the unique electrical signature comprises an object reader, further comprising:

(i) a drive electrode and a sense electrode;
(ii) mounting means for positioning the electrodes adjacent an object reading path;
(iii) a voltage source electrically connected to the drive electrode; and,
(iv) detector means electrically connected to the sense electrode for detecting varying voltage amplitudes capacitively coupled between the drive and sense electrodes by the embedded regions during movement of the object along the path.

The present invention further provides a verifiable object comprising a plurality of randomly-located, irregularly shaped, non-interconnected, electrically conductive regions embedded within the surface of the object, and a unique identifier provided on the object.

The present invention further provides an object authentication device comprising:

(i) a drive electrode and a sense electrode;
(ii) mounting means for positioning the electrodes adjacent an object reading path;
(iii) a voltage source electrically connected to the drive electrode; and,
(iv) detector means electrically connected to the sense electrode for detecting varying voltage amplitudes capacitively coupled between the drive and sense electrodes by the embedded regions during movement of the object along the path.

The present invention further provides an object verification system, comprising:

(a) an object having a plurality of randomly-located irregularly shaped, non-interconnected, electrically conductive regions embedded within the surface of the object, and a unique identifier;
(b) means for generating a digital signature corresponding to said object comprising:
   (i) a drive electrode and a sense electrode;
   (ii) mounting means for positioning the electrodes adjacent an object reading path;
   (iii) a voltage source electrically connected to the drive electrode; and,
   (iv) detector means electrically connected to the sense electrode for detecting varying voltage amplitudes capacitively coupled between the drive and sense electrodes by the embedded regions during movement of the object along the path.
c) means for storing the signature correlated to the unique identifier; and
d) means for comparing the stored signature correlated to the unique identifier to a second signature.

The present invention further provides a method of encoding a card with a secure identification verification means and subsequently verifying the identification means, comprising the steps of:

(a) randomly embedding a plurality of irregularly shaped, non-interconnected, electrically conductive regions within the surface of the card;
(b) moving the card along a card reading path;
(c) capacitively coupling in sequence plurality of said conductive regions to first and second electrodes mounted at a location on the path, as the card progressively moves along the reading path;
(d) detecting the voltage amplitudes capacitively coupled between the electrodes and the sequential embedded regions;
(e) storing, as the identifier, a replica of the voltage amplitudes detected at the selected distances;
(f) subsequently verifying the identification means for a subject card by:
   (i) repeating steps (b), (c) and (d); and
   (ii) comparing the voltage amplitudes detected at during step (f) (i) with the stored replica.

BRIEF DESCRIPTION OF DRAWINGS

In drawings which illustrate a preferred embodiment of the invention:

FIG. 6 is a schematic diagram illustrating a third embodiment of the card reader of the invention having an array of nine electrodes;

FIG. 7A is a partial elevation of the second embodiment of the card reader of the invention shown in FIG. 5 having an array of four electrodes, with cross-sectional views taken along either central axis shown in FIG. 7B and 7C.

BEST MODE(S) FOR CARRYING OUT THE INVENTION

Figure 1:
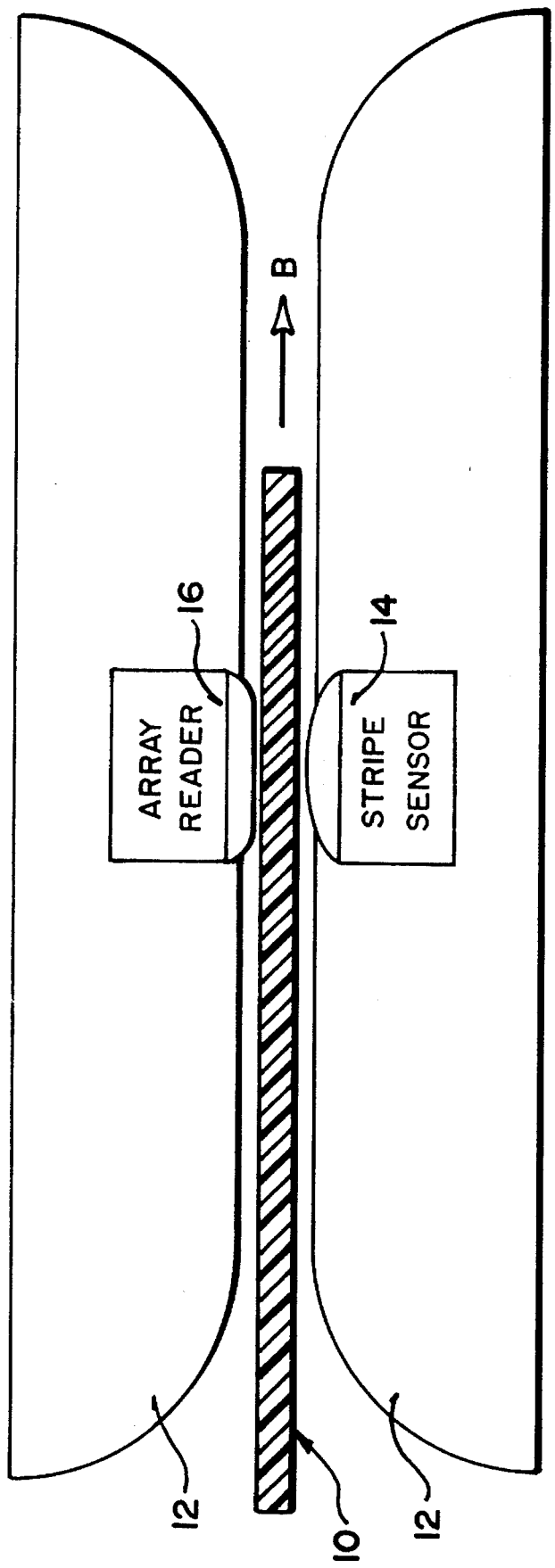
FIG. 1 is a top view of a credit card passing through a card guide and card reader according to the invention.

As illustrated in FIG. 1, a credit card 10 is in the process of being "swiped" through a plastic card 10 is in 12, which is provided with a standard magnetic stripe sensor 14 and a capacitive sensor array 16 according to the invention.

The plastic credit card 10 of the invention has embedded therein planar conductive regions 18, 21 (FIG. 2) of random shapes, sizes, orientations and depth, but mostly arranged with their planar surfaces generally parallel to the broad surfaces of the card. Such a card may be manufactured in a number of ways. For example, randomly sized flakes of a conductive metal, such as aluminum foil, may be mixed into the molten plastic and the mixture rolled out into flat sheets to form cards. Alternatively, a sheet of plastic may be coated with a conductive metal, and the coating etched into random islands. The coated sheet would then be sandwiched between mylar layers. Similarly the metal coating could be applied to a mylar layer, etched into the random shapes and then sandwiched by bonding the mylar layer to a plastic sheet.

Figure 2:
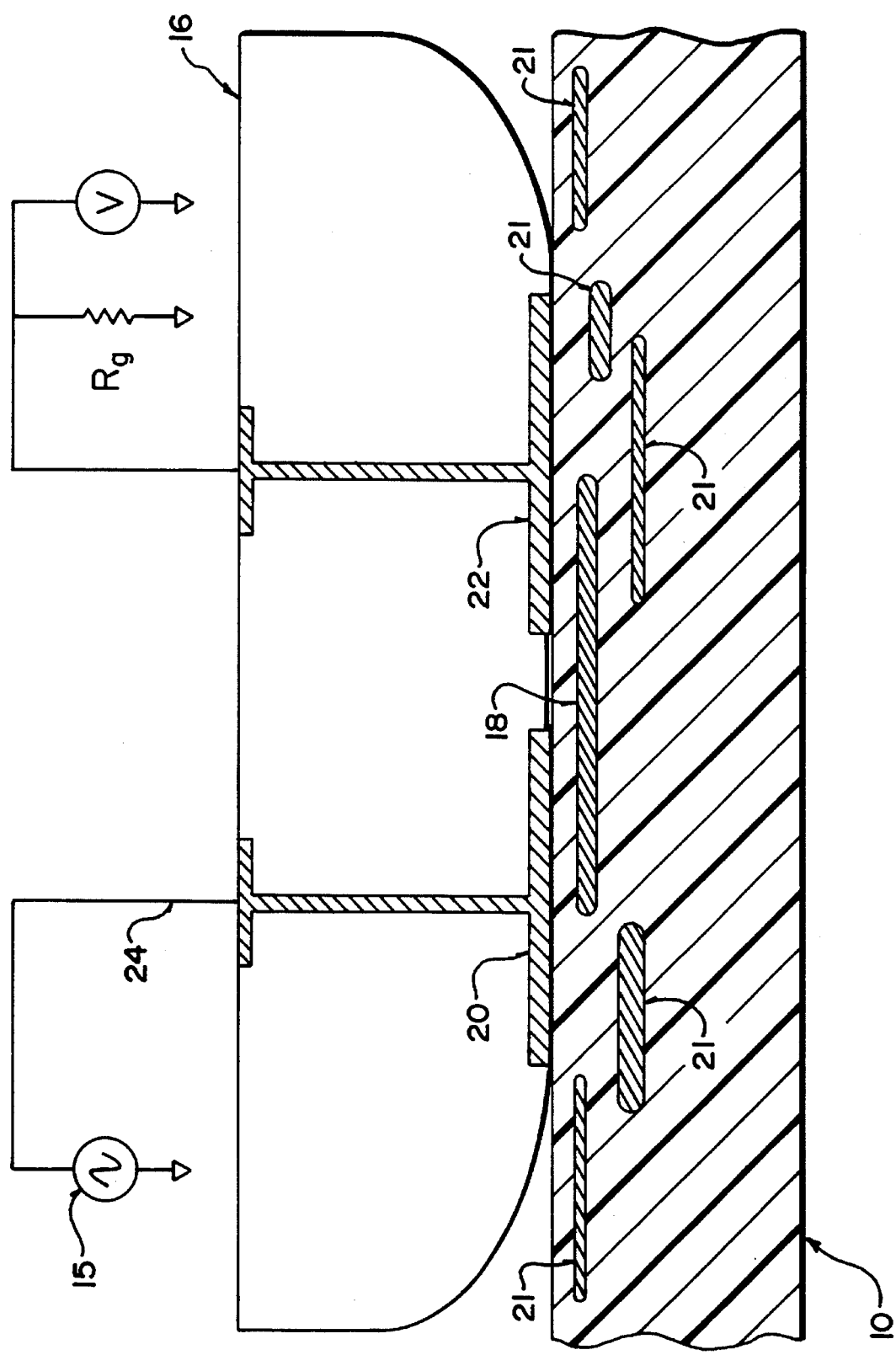
FIG. 2 is a cross-sectional view showing a portion of the card and reader illustrated in FIG. 1.
Figure 3:
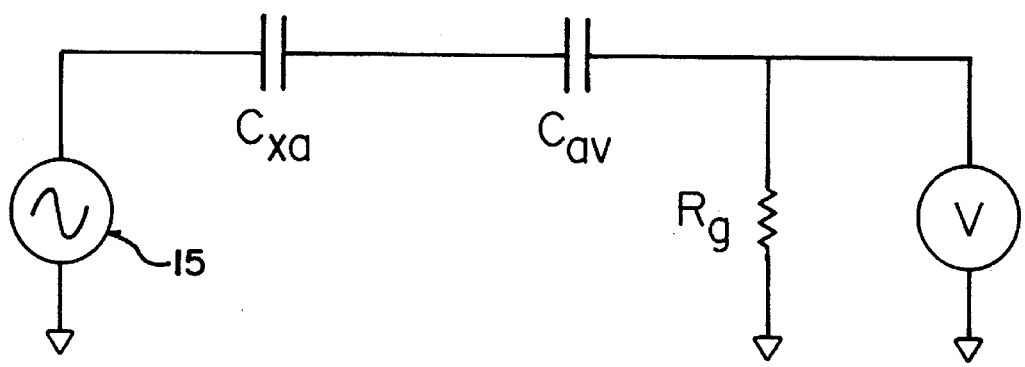
FIG. 3 is a schematic diagram illustrating the equivalent electrical circuit formed by the card and reader illustrated in FIG. 2.

With reference to FIGS. 2 and 3, card reader 16 is provided with dielectric-covered electrodes 20, 22 which come into sliding contact with or in close proximity to the surface of card 10. An AC voltage 15 is applied to electrode 20 through conductor 24. The AC voltage is thus capacitively coupled to a conductive region 18 under electrode 20. If electrode 22 also overlaps the same conductive region 18, the AC voltage is capacitively coupled to electrode 22. The AC voltage measured at V (FIG. 2, 3) depends on the values of the coupling capacitance $C_{xa}$ between the electrode 20 and conductive region 18, and the value of the coupling capacitance $C_{av}$ between the conductive region 18 and the electrode 22, as shown in FIG. 3. To measure the voltage at V, a resistor $R_g$ provides an input impedance off the buffer amplifier connected to the electrode.

Figure 4:
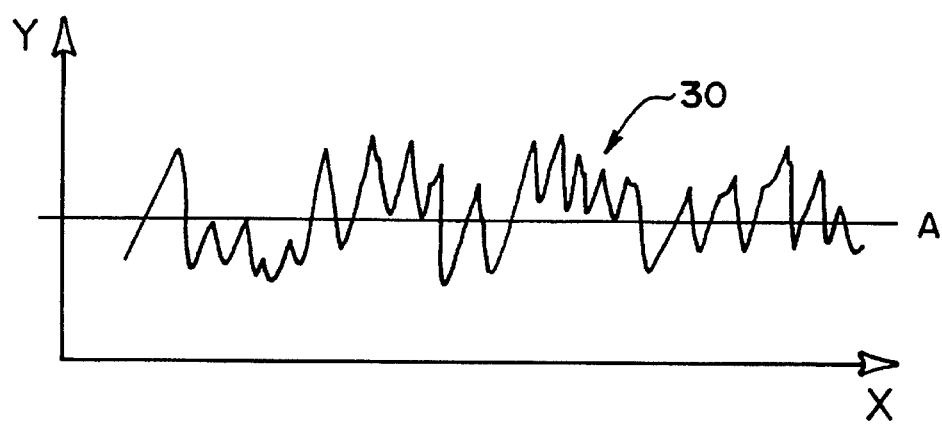
FIG. 4 is a chart illustrating a signature wave form produced by the card reader and card of the invention.

As card 10 is slid past the electrodes 20, 22 in the direction of arrow B, the measured AC voltage amplitude V changes as different conductive regions pass under the electrodes 20, 22, producing a unique amplitude Y vs. travel distance X waveform 30 for a given card, illustrated in FIG. 4., where line A indicates the DC or average amplitude, the Y-axis is the AC amplitude and the X-axis is the distance along the card. This signature waveform 30 may be recorded digitally at specified points along the card as determined by another capacitively or magnetically coded track. This digital record may then be stored as a template or signature associated with the card number stored on the standard magnetic strip.

To verify or authenticate a card, the card signature is read in the same way that the template or signature was stored and is compared to the stored signature associated with the card number. To produce a suitable reading, the card 10 must be swiped through the card reader 12 at the proper height by sliding the bottom edge of the card through the appropriate card guide. If the comparison of the reader output to the stored template satisfies preset criteria (such as the Normalized Correlation Coefficient described in more detail below), then the card is considered genuine.

Figure 5:
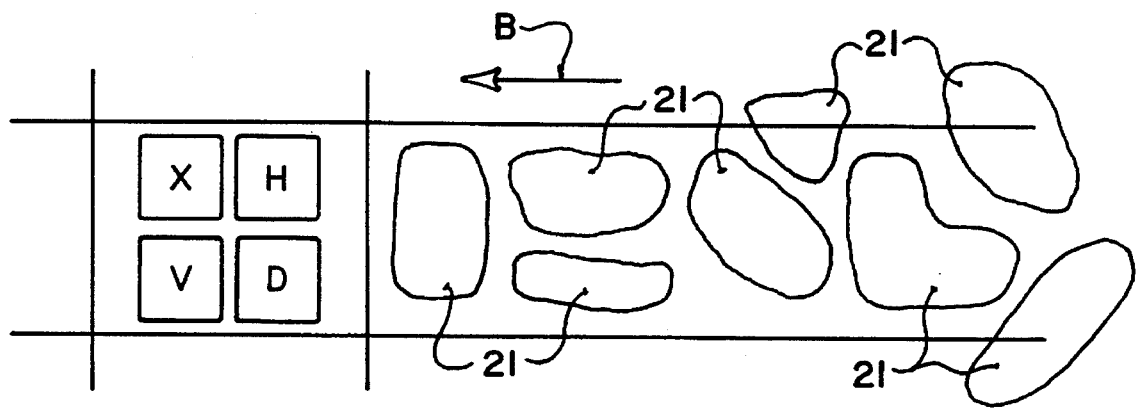
FIG. 5 is a partial elevation of a second embodiment of the card reader of the invention having an array of four electrodes, with the conductive areas of the credit card superimposed.

FIG. 5 illustrates an embodiment of the invention which utilizes four dielectric-covered electrodes X, V, H, D on the card-contacting surface of card reader 14. As in the two-electrode embodiment, an AC voltage is applied to electrode X and AC voltage amplitudes are measured at electrodes V, H, D as the card 10, having planar conductive regions 21 of random shapes, sizes, orientations and depth, but mostly arranged with their planar surfaces generally parallel to the broad surfaces of the card, moves past in direction B. The three recorded signatures are then stored as previously described to verify the card at a later date. A further embodiment using nine electrodes is illustrated in FIG. 6 whereby eight signatures can be recorded per card to provide a greater degree of security.

FIG. 7 illustrates a preferred construction of the sensing electrodes in the embodiment of the invention which utilizes four dielectric-covered sensing electrodes X, V, H, D on the card-contacting surface of card reader 16. The electrode array is fabricated on a ceramic substrate 40. The surface of the electrodes forms a flat area, with the surrounding area curved convexly such that the electrode array is in close contact with or in close proximity to the card, and the card can slide smoothly past the electrode array. The surface dielectric layer is shown at 42. A grounded guard ring 44 is provided with a guard ring ground connection 46.

Figure 8:
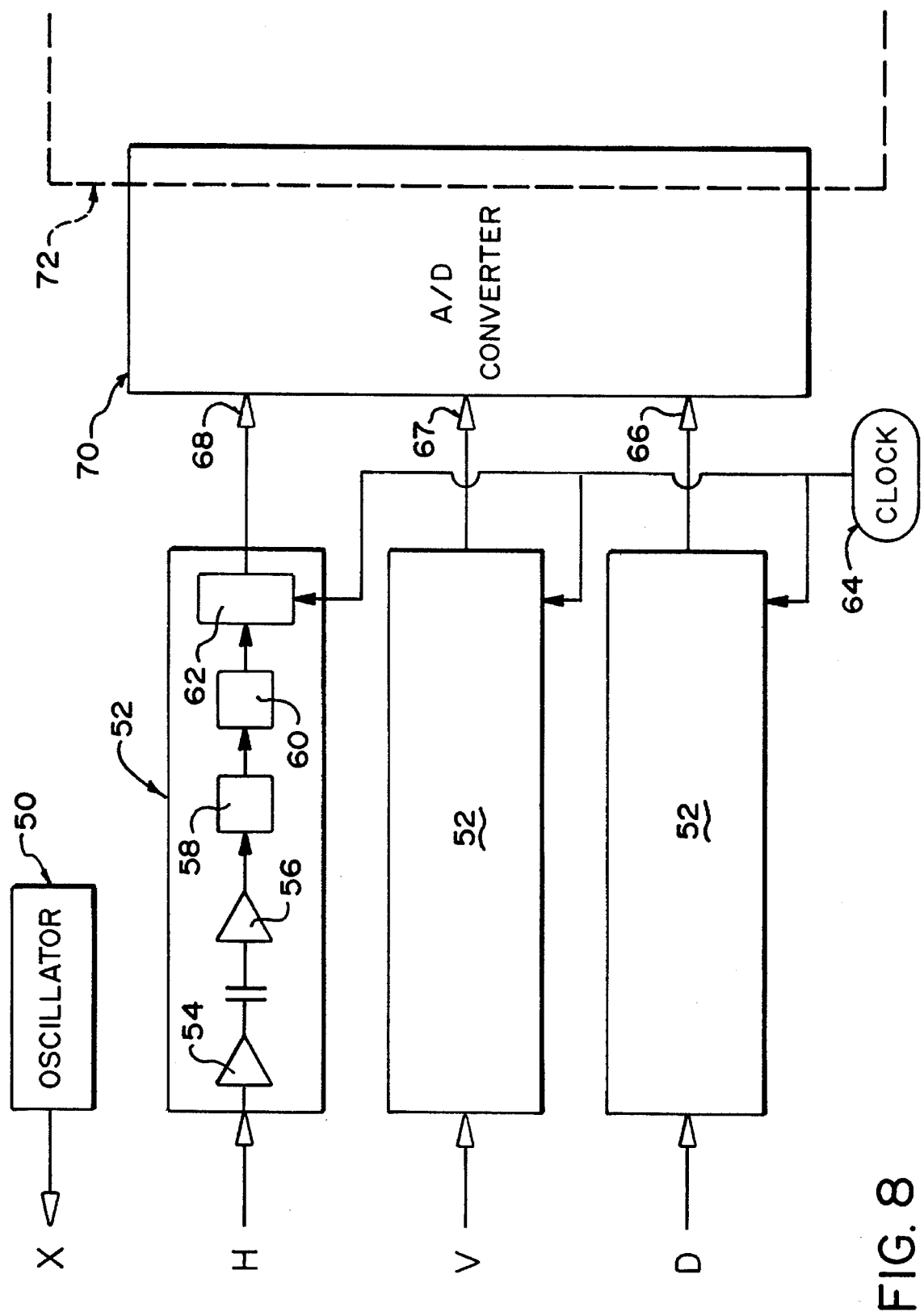
FIG. 8 is a block diagram illustrating a circuit used with the embodiment of the card reader of the invention having an array of four electrodes.

FIG. 8 illustrates by way of a block diagram the circuit used in the embodiment of the invention which utilizes four dielectric-covered sensing electrodes X, V, H, D on the card-contacting surface of card reader 16. A sine wave 240 Khz oscillator 50, with a 4 volt peak amplitude applies the AC voltage to electrode X. The electrodes H, V, D are all connected to similar signal conditioning circuits 52, consisting of a high-input-impedance buffer 54, followed by a high pass amplifier 56 and detector 58, then a low pass filter 60. The high-input-impedance buffer 54 is necessary since the electrode areas must be small to get sufficient resolution of the card signature. Therefore the coupling capacitance must also small and thus provide a high impedance signal source. The AC signal from the buffer is then amplified, detected low pass filtered. The result is a voltage proportional to the amplitude of the AC voltage at the sensing electrode.

The conditioned signals from electrodes H, V, D are each connected to an input of a Sample and Hold circuit 62, operated by a clock signal 64 derived from the magnetic data stripe sensor, which for a specific magnetic data record specifies fixed locations along the card as signal-sampling points. The sampled signals from the H, V, D channels are fed to three inputs 66, 67, 68 of an Analog to Digital Converter 70. The Analog to Digital Converter 70, under the control of microcomputer 72, converts and stores the signals as card signatures.

The stored card signatures are saved as templates for a referenced card number when the card is put into service. In use, the recorded signatures are sent to the data center where these are compared with the stored templates for similarity of waveforms by calculating the Normalized Correlation Coefficient ("NCC") of the AC component of the Template Vector with the AC component of the signature vector for each of the signal channels. If each of the NCC's are above a specified level, say 0.900 (the maximum being 1.0) then the card is deemed acceptable. Otherwise the card is rejected.

For magnetic data clock sampled card signatures, any change in the magnetic data recording results in a different card signature, which may or may not be desirable. Where the magnetic data is changed periodically, a dedicated magnetic clock channel or a capacitive clock channel would be desirable. In the 3 signature prototype tested, using 64 samples 4 bit accuracy per sample was obtained. This results in 768 bits of security data pattern. In production, 512 bits per signature and 8 signatures per card could be used, resulting in 4096 security bits which is very difficult to duplicate.

The NCC's are calculated as follows. An analog waveform such as the voltage signal from the capacitive sensor circuits may be sampled at specified points in time, or as is the case here, at specified points along the card. A set of N values $A_0, A_1, \ldots A_N$ is thereby obtained, which can be regarded as a data vector. The data vector can be normalized, i.e. reduced to a magnitude of 1 by defining the normalized vector $$D_i^* = \left( D_i / \sqrt{\sum_{i=1}^{N} D_i^2} \right)$$

where $D_i^*$ are the components of the normalized vector and $D_i$ the components of the data vector. If the data vectors are similar, their corresponding normalized vectors have equal or near equal components. A good mathematical measure of the similarity of vector components is the dot product. therefore the Normalized Correlation Coefficient is defined as follows:

$$NCC = \Sigma D_1 i / \sqrt{\sum_{j=1}^{N} D_{1j}^2} \cdot D_2 i / \sqrt{\sum_{j=1}^{N} D_{2j}^2}$$

$$= \frac{D_1 \cdot D_2}{\sqrt{D_1 \cdot D_1} \cdot \sqrt{D_2 \cdot D_2}}$$

The maximum value of the NCC is 1 if $D_1 = D_2$ and the minimum value is $-1$ if $D_1 = -D_2$. Thus the NCC will always be between $-1$ and $1$.

The AC component of a data vector can be used for the calculation of the NCC with the following advantages: a) the DC part of the signal varies with amplifier offset voltages which change with temperature and supply voltages. The AC component is largely unaffected by these changes. The shape of the AC component of the data vector, or alternatively a normalized data vector remains constant. b) the AC data vector gives sharper correlation characteristics.

The comparison of the card signature read from the card to be authenticated to the stored template in the present invention is preferably achieved by calculating the Normalized Correlation Coefficient. The data vector $\vec{T} = T_i, i=1, \ldots, n$ is the recorded set of data points for a specific card, and has been referred to as the "template". where a card number XXXXXX is presented, the template for that card number is retrieved from memory and correlated with the data vector $\vec{D} = D_i, i=1, \ldots, n$ read from that card. The NCC is calculated and if less than a predetermined value, the card is rejected.

The AC component of $\vec{D}$ is $$D - <D> = \left( D_i - \sum_{j=1}^{N} \frac{D_j}{N} \right) \text{ for } i = 1, \ldots, N$$

The AC component of $\vec{T}$ is $$T - <T> = \left( T_j - \sum_{k=1}^{N} \frac{D_k}{N} \right) \text{ for } j = 1, \ldots, N$$

Therefore the NCC of the AC components of the data vectors is given by:

$$(D - <D>) \cdot (T - <T>) = D \cdot T - <D> \cdot T - D \cdot <T> + <D><T>$$

$$= D \cdot T - <D> \cdot <T>$$

$$= \sum_i D_i T_i - \frac{\sum_i D_i \sum_j T_j}{N}$$

$$|D - <D>| = \left[ \sum_i D_i^2 - \frac{(\Sigma D_i)^2}{N} \right]^{1/2}$$

$$|T - <T>| = \left[ -\sum_i T_i^2 - \frac{(\Sigma T_i)^2}{N} \right]^{1/2}$$

$$NCC = \frac{(D - <D>) \cdot (T - <T>)}{|D - <D>| \cdot |T - <T>|}$$

$$= \frac{\sum_i D_i \cdot T_i - \sum_i D_i \cdot \sum_i T_i / N}{\left[ \sum_i D_i^2 - \left( \sum_i D_i \right)^2 / N \right]^{1/2} \left[ \sum_i T_i^2 - \left( \sum_i T_i \right)^2 / N \right]^{1/2}}$$

As will be apparent to those skilled in the art in the light of the foregoing disclosure, many alterations and modifications are possible in the practice of this invention without departing from the spirit or scope thereof. The invention is not restricted to credit card verification but has application wherever the authenticity of a document is to be established, such as high security entry control, security for negotiable instruments or large bank notes, identification cards and passports. Accordingly, the scope of the invention is to be construed in accordance with the substance defined by the following claims.

What is claimed is:

1. An object verification system, comprising:
    (a) an object, comprising a plurality of randomly-located, non-interconnected, electrically conductive regions embedded within said object;
    (b) means for generating a reference digital signature corresponding to said object comprising:
        (i) a first drive electrode and a first sense electrode;
        (ii) first mounting means for positioning said first drive electrode and said first sense electrode adjacent a first object reading path;
        (iii) a first AC voltage source electrically connected to said first drive electrode; and,
        (iv) first detector means electrically connected to said first sense electrode for detecting varying voltage amplitudes as a consequence of capacitive coupling between said first drive electrode and first sense electrodes by said randomly-located, non-interconnected, electrically conductive regions during movement of said object along said object reading path;
    (c) means for storing said reference digital signature;
    (d) means for generating a verification digital signature corresponding to said object comprising:
        (i) a second drive electrode and a second sense electrode;
        (ii) second mounting means for positioning said second drive electrode and said second sense electrode adjacent a second object reading path;
        iii) a second AC voltage source electrically connected to said second drive electrode; and,
        (iv) second detector means electrically connected to said second sense electrode for detecting varying voltage amplitudes as a consequence of capacitive coupling between said second drive electrode and said second sense electrodes by said randomly-located, non-interconnected, electrically conductive regions during movement of said object along said second object reading path; and
    (e) means for comparing said stored reference digital signature to said verification digital signature;
    whereby said reference digital signature is first generated by said means for generating a reference digital signature by movement of said object along said first object reading path and is stored in said means for storing, and subsequently said verification digital signature is generated by said means for generating a verification digital signature by movement of said object along said second object reading path and is compared to said stored reference digital signal and whereby said reference digital signature generated by said means for generating a reference digital signature and said verification digital signal generated by said means for generating a verification digital signature are substantially the same for a given object.

2. The system of claim 1 wherein said object is a card.

3. The system of claim 1 wherein said means for generating a reference digital signature and said means for generating a verification digital signature each comprise a plurality of sense electrodes, and said first and second detector means respectively is electrically connected to each said plurality of sense electrodes for detecting varying voltage amplitudes capacitively coupled between said drive electrode and each said sense electrodes by said randomly-located, non-interconnected, electrically conductive regions during movement of said object along said first and second object reading paths.

4. A system as defined in claim 1, wherein said randomly-located, non-interconnected, electrically conductive regions are irregularly shaped.

5. A system as defined in claim 1, wherein
    (a) said object has a planar surface; and,
    (b) said randomly-located, non-interconnected, electrically conductive regions comprise planar surfaces oriented substantially parallel to said planar surface of said object.

6. A method of encoding a card having broad parallel planar surfaces with a unique identifier and subsequently verifying said unique identifier, comprising the steps of:
    (a) embedding a plurality of irregularly shaped, non-interconnected, electrically conductive regions within said card;
    (b) moving said card a given distance along a card reading path;
    (c) during said moving step:
        (i) applying a voltage to said card at a first location on said path by means of a first electrode in contact with or closely proximate to one of said planar card surfaces;
        (ii) at a second location on said path, by means of a second electrode, detecting voltage amplitudes capacitively coupled between said first and second electrodes by said irregularly shaped, non-interconnected, electrically conductive regions;
    (d) storing, as said unique identifier, a replica of a series of voltage amplitudes detected at said second location as said card is moved said given distance along said card reading path;
    (e) subsequently verifying said identifier by:
        (i) repeating steps (b) and (c) to produce a second series of voltage amplitudes detected at said second location;
        (ii) comparing said second series of voltage amplitudes detected at said second location with said stored replica; and
        (iii) determining whether said compared values match one another within a predefined range.

7. A method as defined in claim 6, further comprising:
    (a) during step 6(c) (ii), simultaneously detecting, at one or more additional locations on said path, voltage amplitudes capacitively coupled between said first location and said additional locations by said irregularly shaped, non-interconnected, electrically conductive regions;
    (b) during step 6(d), additionally storing, as said unique identifier, replicas of said voltage amplitudes detected at said one or more additional locations during said step 7(a); and,
    (c) during said subsequent verification step, simultaneously
        (i) repeating step 6(c) (ii) at each of said additional locations;
        (ii) comparing said voltage amplitudes detected at said one or more additional locations during step 7(c) (i) with said replicas stored during step 7(b); and (iii) determining whether said compared values match one another within a predefined range.

8. A method as defined in claim 7, wherein said irregularly shaped, non-interconnected, electrically conductive regions have randomly varied sizes.

9. A method as defined in claim 8, wherein said irregularly shaped, non-interconnected, electrically conductive regions are located at randomly varied depths within said card.

10. A method as defined in claim 9, wherein said irregular shapes are substantially planar.

11. A method as defined in claim 10, wherein:
   (a) said card has planar surfaces; and,
   (b) said irregularly shaped, non-interconnected, electrically conductive regions are generally planar and oriented substantially parallel to said card surfaces.

12. A method as defined in claim 11, wherein said irregularly shaped, non-interconnected, electrically conductive regions have randomly varied shapes.

13. A method as defined in claim 12, wherein said irregularly shaped, non-interconnected, electrically conductive regions have randomly varied sizes.

14. A method as defined in claim 13, wherein said irregularly shaped, non-interconnected, electrically conductive regions are located at randomly varied depths within said card.

15. A method of authenticating an object, comprising:
   i) embedding a randomly-located plurality of irregularly shaped, non-interconnected, electrically conductive regions within the surface of said object to thereby provide a unique electrically readable signature correlated to said object by capacitively coupling thereto at a first location an AC voltage as said object is moved past said first location;
   ii) providing a unique identifier associated with said object;
   iii) electrically reading said unique signature by detecting a voltage at a second location as said object is moved past said second location and digitally storing said unique signature in connection with said unique identifier for said object;
   iv) subsequently electrically reading said unique identifier and said unique signature of said object; and
   v) comparing said subsequently read unique signature of said object to said stored signature correlating to said subsequently read unique identifier.

16. A card verification system, comprising:
   (a) a card, comprising a thin planar body provided with a plurality of randomly-located, non-interconnected, electrically conductive regions embedded within said body, and provided with a magnetic stripe for carrying a unique electromagnetic identifier;
   (b) means for generating a reference digital signature corresponding to said card comprising:
      (i) a drive electrode and a sense electrode;
      (ii) mounting means for positioning said electrodes adjacent a card reading path;
      (iii) an AC voltage source electrically connected to said drive electrode; and,
      (iv) detector means electrically connected to said sense electrode for detecting varying voltage amplitudes as a consequence of capacitive coupling between said drive and sense electrodes by said randomly-located, non-interconnected, electrically conductive regions during movement of said card along said path;
   (c) means for storing said reference digital signature correlated to said unique identifier;
   (d) means for reading said unique identifier on said card and generating a verification digital signature corresponding to said card comprising:
      (i) a drive electrode and a sense electrode;
      (ii) mounting means for positioning said electrodes adjacent a card reading path;
      (iii) an AC voltage source electrically connected to said drive electrode; and,
      (iv) detector means electrically connected to said sense electrode for detecting varying voltage amplitudes as a consequence of capacitive coupling between said drive and sense electrodes by said randomly-located, non-interconnected, electrically conductive regions during movement of said card along said path; and
   (d) means for comparing said stored reference digital signature correlated to said unique identifier to said verification digital signature.

17. The system of claim 1 wherein said object is further provided with a unique identifier, and said reference digital signal is stored with said unique identifier.

* * * * *